United States Patent [19]

Foss et al.

[11] 3,903,168

[45] Sept. 2, 1975

[54] STABLE ANIONIC POLYMERIZATION INITIATOR

[75] Inventors: Robert P. Foss, Hockessin; Henning W. Jacobson, Wilmington, both of Del.

[73] Assignee: E. I. Du Pont de Nemours and Company, Wilmington, Del.

[22] Filed: Nov. 23, 1973

[21] Appl. No.: 418,578

[52] U.S. Cl. .................. 260/583 R; 260/94.2 M
[51] Int. Cl.² ................. C07C 87/08; C07C 87/10; C07C 87/123; C07C 87/127
[58] Field of Search ...... 260/583 R, 563 R, 570.5 R

[56] References Cited
UNITED STATES PATENTS 3,234,277  2/1966  Beumel, Jr. et al. ............ 260/583 R
3,234,284  2/1966  Beumel, Jr. et al. ............ 260/583 R
3,321,479  5/1967  Eberhardt et al. .......... 260/583 R X
3,734,963  5/1973  Langer, Jr. et al. ............ 260/563 R

*Primary Examiner*—Joseph P. Brust

[57] ABSTRACT

The sequential reaction of m-diisopropenylbenzene, an alkyllithium and butadiene or isoprene in the presence of 0.01 to 1.0 mole of a tertiary amine per mole of m-diisopropenylbenzene/alkyllithium adduct in a hydrocarbon solvent yields stable solutions of anionic polymerization initiators suitable for the polymerization of dienes.

4 Claims, No Drawings

STABLE ANIONIC POLYMERIZATION INITIATOR

BACKGROUND OF THE INVENTION

1. Field of Invention

This invention relates to hydrocarbon-soluble dianionic initiator systems prepared from an alkyllithium, m-diisopropenylbenzene, butadiene or isoprene and a tertiary alkylamine, which have unique stability.

2. Description of the Prior Art

Dilithioisoprene and dilithio-α-methylstyrene oligomers and their use as anionic polymerization initiators are disclosed by Karoly (ACS Polymer Preprints, September 1969, 10, No. 2). Fetters and Morton (Macromolecules 1969, 2, 453) disclose 1,4-dilithio-1,1,4,4-tetraphenylbutane capped with low molecular weight polyisoprene as an anionic initiator. Difunctional organolithium initiators available from Lithium Corporation of America include "DiLi-1A," composed of dilithium oligomers of isoprene, "DiLi-3," composed of α-lithio-substituted dialkylbenzene monomers and oligomers, and "DiLi-4," composed of an isoprene adduct of 3- and 4- (lithiomethyl) -1-(1-lithio-3-methylpentyl) benzene (cf. Kamienski, Polymer Preprints, First Akron Summit Polymer Conference, Symposium on Anionic Polymerization, University of Akron, June 1970, p. 24; Lithium Corporation of America Product Bulletins 191 and 192; German Pat. No. 2,063,642). These "DiLi" initiators contain hydrocarbon solvents (benzene, cyclohexane, n-hexane) and triethylamine in a mole ratio to lithium of about 4:1. The coassigned Foss application Ser. No. 324,502 (now U.S. Pat. No. 3,821,331, issued June 28, 1974) discloses an anionic initiator system which is a cyclohexane solution of 1,3-bis(1-lithio-1,3-dimethylpentyl) benzene [prepared from sec-butyllithium and m-diisopropenylbenzene] containing three equivalents of triethylamine per equivalent of lithium.

SUMMARY OF THE INVENTION

The products of this invention are stable, hydrocarbon-soluble, dianionic polymerization initiators derived by sequential reaction of m-diisopropenylbenzene, an alkyllithium and butadiene or isoprene in a suitable hydrocarbon solvent containing a specified amount of a tertiary alkylamine.

These products can be represented as follows:

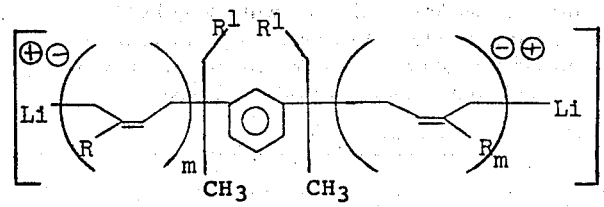 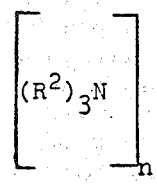

where R is hydrogen or methyl, $R^1$ is a secondary, tertiary alkyl or a cycloalkyl group of up to 10 carbon atoms, $R^2$ is an alkyl group of 1–6 carbon atoms, $m$ is an integer of 3–10 and $n$ is a number in the range 0.01–1.0 inclusive. These initiators are normally used in solution in a hydrocarbon solvent, and such solutions are stable indefinitely in storage at room temperature under oxygen- and moisture-free conditions.

DETAILS OF THE INVENTION

The initiators of the invention are readily prepared in sequential fashion in a hydrocarbon solvent under anhydrous conditions and an inert atmosphere. The solvent and alkylamine, in carefully measured amounts, are initially blended in a suitable reactor; the alkyllithium, which is of known concentration and preferably in a hydrocarbon solvent such as n-hexane is added; and the diisopropenylbenzene, in precisely a 1:1 equivalent ratio (1:2 mole ratio) with the alkyllithium, is then introduced gradually over a period of about 15 minutes with stirring at room temperature. The reaction mixture immediately assumes a red color. After the addition of diisopropenylbenzene is complete, the reaction mixture is stirred until no residual unsaturation can be detected by nmr. The alkadiene monomer is finally added rapidly (in one portion) with stirring; the red color begins to fade; and after about one hour at room temperature the initiator preparation, which has a light red color, is considered to be complete and is recorded as being zero hours in age. The reaction mixture is stored in the original reactor-container at room temperature under dry nitrogen.

The solvent used in the preparation can be any normally liquid hydrocarbon which is nonreactive with an alkyllithium. Representative suitable solvents are n-hexane and cyclohexane.

The reaction is normally carried out at room temperature and essentially atmospheric pressure, but can be accomplished without trouble at any combination of temperature under about 50° and pressure which will maintain the reaction mixture in homogeneous fluid condition.

Secondary or tertiary alkyllithiums corresponding to $R^1Li$ are used in making the products. Representative alkyllithiums are sec-butyllithium, t-butyllithium, isopropyllithium, 1-methylpentyllithium, cyclohexyllithium and menthyllithium. Sec-butyllithium is a preferred alkyl-lithium, and accordingly the sec-butyl group is a preferred value of $R^1$.

The tertiary amine component of the product, represented by $(R^2)_3N$, can be any saturated tertiary lower alkylamine. Representative amines are trimethylamine, triethylamine (preferred, $R^2$ being ethyl), tributylamine and trihexylamine.

The products of the invention are termed polyalkadiene-capped 1,3-bis(1-lithio-sec-alkyl)benzene initiators. Uncapped bis(lithioalkyl)benzene initiators are well known (cf, "DiLi-3"), and polyisoprene-capped 1,4-dilithio-1,1,4,4-tetraphenylbutane initiator is also known (cf, Fetters and Morton). The latter polyisoprenyl initiator contains no tertiary amine, may optionally contain an ether cosolvent, and has polyisoprenyl segments containing more than 10 isoprene monomer units.

The distinctive, sought-for but generally elusive, advantage of the initiator of this invention is long term stability of its solutions in a hydrocarbon solvent. This stability includes both physical and chemical stability as demonstrated by retention of clarity with no formation of precipitate and by retention of a consistent predictable performance as an initiator. The performance as an initiator for preparation of polyalkadienes is outstanding in that the polydiene products have predictable molecular weights and are characterized by monomodal, narrow molecular weight distribution. These qualities confer low viscosity in the melt and provide the basis for good molding and melt-spinning performance of thermoplastic elastomeric block copolymers derived from the polydienes as substrates.

SPECIFIC EMBODIMENTS OF THE INVENTION

The following examples illustrate the preparation and properties of a representative initiator of this invention and comparison of its performance with closely similar but much less consistent initiators typical in behavior of some in the prior art. In these examples temperatures are given in degrees centigrade. In the interest of simplified yet fully explanatory nomenclature the various initiators are identified by the code DIPLIT-$m,n$ wherein DIP - represents n-diisopropenylbenzene
L - represents lithium
I - represents isoprene
T - represent triethylamine
$m$ - represents moles of isoprene per gram-atom of lithium (similar to $m$ in the preceding general formula)
$n$ - represents moles of triethylamine per gram-atom of lithium (similar to $2n$ in the preceding general formula)

EXAMPLE 1
DIPLIT 5,0.1 Initiator

A 500-ml bottle containing a magnetic stirring bar was dried overnight at 150°, closed under nitrogen with a serum stopper and arranged for maintenance of an inert atmosphere by means of a hypodermic needle piercing the stopper and connected through a T-tube to a supply of argon and an air-excluding bubbler. The bottle was charged via a hypodermic syringe successively with 430 ml of cyclohexane, 41.5 ml (1.21N in hexane, 50 meq) of sec-butyl-lithium, 0.7 ml (5 meq) of triethylamine and 4.35 ml (50 meq) of m-diisopropenylbenzene. The cyclohexane had been freshly purified by refluxing over sodium followed by distillation. Each of the amine and diisopropenylbenzene had been purified by trap-to-trap distillation under vacuum from supplies containing n-butyllithium as a scavenger, foreshots being removed until nmr analysis showed absence of any diluent hexane introduced with the n-butyllithium. The m- diisopropenylbenzene was added dropwise over a period of about 15 minutes with stirring of the reaction mixture at room temperature. The solution became red in color after a few minutes, and after the addition was complete the red solution was stirred overnight at room temperature. The final reaction mixture, after about 18 hours, was found by nmr to be free of residual unsaturation, indicating complete reaction of the dissopropenylbenzene. At this stage 25 ml (250 meq) of freshly distilled isoprene was added rapidly with stirring. The color of the solution began to fade and after one hour, though still red, was much lighter than before. At this point the initiator preparation, close to 0.1N in concentration, was considered complete and to be zero hours in age. The bottle containing the initiator, after removal of the argon-atmosphere-maintaining hypodermic needle, was stored under nitrogen at room temperature in a dry box.

Using the above general procedure with appropriate amounts of triethylamine and without any isoprene, uncapped DIPLIT-0,0; -0,.1; -0,.2; -0,.4; -0,1; -0,3 and -0,10 initiators were also prepared.

EXAMPLE 2
Polyisoprene Prepared with DIPLIT-5,.1 Initiator

A dry 250-ml flask containing a magnetic stirring bar and closed with a serum stopper was arranged for maintenance of an inert atmosphere through a side arm attached to a glass T-tube, one arm of which was connected to a source of argon and the other to a bubbler. The flask was dried by flaming it out under a heavy flow of argon and then was allowed to cool to room temperature. The flask was then charged by means of a hypodermic syringe with 100 ml of cyclohexane and 15 ml (150 meq) of isoprene. The cyclohexane had been freshly purified as in Example 1, and the isoprene had been purified by adding n-butyllithium to dry, polymerization grade isoprene and allowing the heat of the resulting polymerization to distill monomeric isoprene into a dry, ice-cooled vessel protected from the atmosphere by argon. After the isoprene had been added the stirring bar was activated, the solution in the flask was heated to 60° by means of an oil bath, and 8 ml (0.1N, 0.8 meq) of the DIPLET-5,0.1 initiator solution of Example 1 was added via a hypodermic syringe. Stirring of the polymerization mixture at 60° was continued for 2 hours, at which time polymerization was terminated by addition of a small volume of methanol diluted with tetrahydrofuran. The solvent was then substantially removed under vacuum and the residual polymer was redissolved in tetrahydrofuran.

The tetrahydrofuran solution of polyisoprene was analyzed by gel permeation chromatography (GPC) for characterization by $M_n$ (number average molecular weight), $M_w$ (weight average molecular weight) and $d$ (dispersity $=M_w/M_n$). The theoretical molecular weight of the polyisoprene prepared by this recipe is calculated at about 25 M.

Analytical characterization by GPC of polyisoprenes prepared as described above with the DIPLIT-5,.1 initiator of Example 1 at various stages in its aging showed no substantial changes in $M_n$, $M_w$ and $d$ due to the age of the initiator over a period of 72 days.

TABLE I

| Age | GPC Data | | |
| (Days) | $M_n$ | $M_w$ | d |
|---|---|---|---|
| 0 | 20 M | 25 M | 1.27 |
| 1 | 21 M | 26 M | 1.26 |
| 2 | 20 M | 26 M | 1.28 |
| 5 | 22 M | 28 M | 1.25 |
| 8 | 23 M | 28 M | 1.25 |
| 9 | 23 M | 29 M | 1.28 |
| 15 | 24 M | 29 M | 1.24 |
| 72 | 21 M | 26 M | 1.27 |

In contrast to the above, uncapped ($m$=0) DIPLIT initiators were found unable to give predictable or consistent results over a reasonable aging period. This is illustrated by the data in Table II for polyisoprenes prepared with uncapped initiators by the procedure of Example 2.

TABLE II

| DIPLIT (m, n) | Age (Days) | GPC Data $M_n$ | $M_w$ | d | Remarks |
|---|---|---|---|---|---|
| 0, 0 | 0 | 37 M | 46 M | 1.25 | Initiator showed rapid formation of precipitate in its initial solution |
| 0, .1 | 0 | 25 M | 31 M | 1.23 | Fresh initiator OK, but showed precipitate in aged samples |
|  | 4 | 33 M | 42 M | 1.28 |  |
|  | 11 | 43 M | 62 M | 1.47 |  |
| 0, .2 | 0 | 26 M | 37 M | 1.42 | Initiator showed precipitate in aged samples |
|  | 3 | 32 M | 48 M | 1.37 |  |
|  | 7 | 47 M | 69 M | 1.47 |  |
| 0, 1 | 1 | 26 M | 72 M | 2.77 | Precipitate in aged samples of initiator |
|  | 11 | 32 M | 49 M | 1.56 |  |
| 0, 3 | 20 | 22 M | 104 M | 4.70 | Polymers showed broad bimodal GPC curves |
|  | 52 | 26 M | 55 M | 2.11 |  |
| 0, 4 | 11 | 25 M | 62 M | 2.47 | Polymer showed broad bimodal GPC curves |
| 0, 10 | 0 | 20 M | 50 M | 2.56 | Polymers showed broad bimodal GPC curves |
|  | 2 | 21 M | 52 M | 2.47 |  |
|  | 4 | 23 M | 53 M | 2.28 |  |

Since any obvious modifications will occur to one skilled in the art, we intend to be bound solely by the appended claims.

We claim:

1. A compound having the formula:

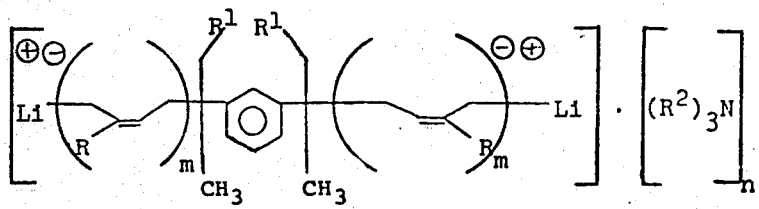

wherein;

R is H or methyl;

$R^1$ is secondary alkyl, tertiary alkyl or cycloalkyl of up to 10 carbon atoms;

$R^2$ is alkyl of 1 to 6 carbon atoms;

$m$ is an integer of 3–10; and $n$ is a number in the range 0.01 to 1.0 inclusive.

2. Compound of claim 1 wherein R is methyl.

3. Compound of claim 2 wherein $R^1$ is sec-butyl.

4. Compound of claim 3 wherein $R^2$ is ethyl.

* * * * *